(12) United States Patent
Skene et al.

(10) Patent No.: US 10,326,799 B2
(45) Date of Patent: *Jun. 18, 2019

(54) HORIZONTAL SWITCH SCALABILITY VIA LOAD BALANCING

(71) Applicant: Tempered Networks, Inc., Seattle, WA (US)

(72) Inventors: Bryan David Skene, Seattle, WA (US); Jeff James Costlow, Bellevue, WA (US); Ludwin Fuchs, Seattle, WA (US)

(73) Assignee: Tempered Networks, Inc. Reel/Frame: 043222/0041, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,859

(22) Filed: Aug. 7, 2017

(65) Prior Publication Data

US 2018/0183833 A1  Jun. 28, 2018

Related U.S. Application Data

(63) Continuation of application No. 15/201,063, filed on Jul. 1, 2016, now Pat. No. 9,729,581.

(51) Int. Cl.
*H04L 29/06* (2006.01)
*H04L 12/803* (2013.01)
(Continued)

(52) U.S. Cl.
CPC .............. *H04L 63/20* (2013.01); *H04L 45/02* (2013.01); *H04L 47/125* (2013.01); *H04L 63/06* (2013.01);
(Continued)

(58) Field of Classification Search
CPC ....... H04L 63/20; H04L 63/06; H04L 63/164; H04L 45/02; H04L 47/125; H04L 67/10;
(Continued)

(56) References Cited

U.S. PATENT DOCUMENTS

| 5,835,727 A | 11/1998 | Wong et al. |
| 6,981,156 B1 | 12/2005 | Stern et al. |

(Continued)

FOREIGN PATENT DOCUMENTS

| WO | 2007038872 A1 | 4/2007 |
| WO | 2008039506 A2 | 4/2008 |

OTHER PUBLICATIONS

Official Communication for U.S. Appl. No. 15/156,254 dated Oct. 19, 2017, 13 pages.

(Continued)

*Primary Examiner* — Catherine Thiaw
(74) *Attorney, Agent, or Firm* — John W. Branch; Lowe Graham Jones PLLC

(57) ABSTRACT

Embodiments are directed to secure communication over a network. If a source node sends a communication to a target node, a source gateway may forward the communication to the target node. The source gateway may provide a gateway identifier (GID) that may be associated with one or more target gateways associated with the target node. Further, the source gateway may embed marker information that includes at least a portion of the GID in the communication. If the GID is associated with more than one target gateway, a TMD selects one target gateway from the more than one target gateways. Also, the TMD provides a gateway key associated with the selected target gateway that is associated with the communication. And, the TMD may provide the communication to the selected target gateway that provides the communication to the target node.

18 Claims, 11 Drawing Sheets

(51) Int. Cl.
*H04L 29/08* (2006.01)
*H04L 12/751* (2013.01)
(52) U.S. Cl.
CPC .......... *H04L 67/10* (2013.01); *H04L 67/1027* (2013.01); *H04L 67/1036* (2013.01); *H04L 67/327* (2013.01); *H04L 63/164* (2013.01)
(58) Field of Classification Search
CPC ............. H04L 67/1027; H04L 67/1036; H04L 67/327
See application file for complete search history.

(56) References Cited

U.S. PATENT DOCUMENTS

| | | | |
|---|---|---|---|
| 7,209,956 B2* | 4/2007 | Mache | H04L 51/04 709/207 |
| 7,324,533 B1 | 1/2008 | DeLiberato et al. | |
| 7,373,660 B1 | 5/2008 | Guichard et al. | |
| 7,395,349 B1 | 7/2008 | Szabo et al. | |
| 7,796,593 B1 | 9/2010 | Ghosh et al. | |
| 7,881,199 B2 | 2/2011 | Krstulich | |
| 7,996,894 B1 | 8/2011 | Chen et al. | |
| 8,224,971 B1* | 7/2012 | Miller | H04L 12/4641 370/254 |
| 8,429,400 B2* | 4/2013 | Khalid | H04L 9/0833 380/285 |
| 8,489,701 B2 | 7/2013 | Manion et al. | |
| 8,607,301 B2 | 12/2013 | Carrasco | |
| 8,886,827 B2 | 11/2014 | Goel et al. | |
| 8,959,513 B1 | 2/2015 | Swaminathan | |
| 9,264,522 B1 | 2/2016 | Reeves et al. | |
| 2002/0026532 A1 | 2/2002 | Maeda et al. | |
| 2002/0073182 A1 | 6/2002 | Zakurdaev et al. | |
| 2002/0143855 A1 | 10/2002 | Traversat et al. | |
| 2003/0061479 A1 | 3/2003 | Kimura | |
| 2003/0081620 A1 | 5/2003 | Danner et al. | |
| 2004/0143628 A1 | 7/2004 | Bradford et al. | |
| 2004/0268121 A1 | 12/2004 | Shelest et al. | |
| 2005/0052999 A1 | 3/2005 | Oliver et al. | |
| 2005/0265355 A1 | 12/2005 | Havala et al. | |
| 2006/0190458 A1 | 8/2006 | Mishina et al. | |
| 2007/0019641 A1 | 1/2007 | Pai et al. | |
| 2007/0081530 A1 | 4/2007 | Nomura et al. | |
| 2007/0226781 A1 | 9/2007 | Chen et al. | |
| 2007/0230352 A1 | 10/2007 | Kokku et al. | |
| 2007/0258440 A1 | 11/2007 | Watanabe | |
| 2008/0072282 A1 | 3/2008 | Willis et al. | |
| 2008/0082823 A1 | 4/2008 | Starrett et al. | |
| 2008/0151916 A1 | 6/2008 | Jetcheva et al. | |
| 2008/0288614 A1 | 11/2008 | Gil et al. | |
| 2008/0307519 A1 | 12/2008 | Curcio et al. | |
| 2009/0034738 A1 | 2/2009 | Starrett | |
| 2009/0129374 A1 | 5/2009 | Yurchenko et al. | |
| 2009/0210518 A1 | 8/2009 | Verma et al. | |
| 2009/0310518 A1 | 12/2009 | Jayaram et al. | |
| 2010/0014533 A1 | 1/2010 | Hirano et al. | |
| 2010/0024026 A1 | 1/2010 | Ylonen et al. | |
| 2010/0027442 A1 | 2/2010 | Chockler et al. | |
| 2010/0042747 A1 | 2/2010 | Hascalovici et al. | |
| 2010/0214959 A1 | 8/2010 | Kuehnel et al. | |
| 2010/0218235 A1 | 8/2010 | Ganot | |
| 2010/0254395 A1 | 10/2010 | Smith et al. | |
| 2011/0016509 A1 | 1/2011 | Huang et al. | |
| 2011/0035466 A1 | 2/2011 | Panirahi | |
| 2011/0090892 A1 | 4/2011 | Cooke | |
| 2011/0103393 A1 | 5/2011 | Meier et al. | |
| 2011/0141881 A1 | 6/2011 | Joshi et al. | |
| 2012/0110203 A1 | 5/2012 | Ozawa | |
| 2012/0163196 A1 | 6/2012 | Jansen et al. | |
| 2012/0304243 A1 | 11/2012 | Li et al. | |
| 2013/0018993 A1 | 1/2013 | Hui et al. | |
| 2013/0083725 A1 | 4/2013 | Mallya et al. | |
| 2013/0198830 A1 | 8/2013 | Nemoto et al. | |
| 2013/0254264 A1 | 9/2013 | Hankinson et al. | |
| 2013/0283364 A1 | 10/2013 | Chang et al. | |
| 2014/0133354 A1 | 5/2014 | Scharf et al. | |
| 2014/0150070 A1 | 5/2014 | Peterson | |
| 2014/0223507 A1 | 8/2014 | Xu | |
| 2014/0282817 A1 | 9/2014 | Singer et al. | |
| 2014/0307744 A1 | 10/2014 | Dunbar et al. | |
| 2014/0348131 A1 | 11/2014 | Duan et al. | |
| 2015/0024677 A1 | 1/2015 | Gopal et al. | |
| 2015/0046997 A1 | 2/2015 | Gupta et al. | |
| 2015/0067033 A1 | 3/2015 | Martinsen et al. | |
| 2015/0124823 A1 | 5/2015 | Pani et al. | |
| 2015/0135259 A1 | 5/2015 | Ilyadis et al. | |

OTHER PUBLICATIONS

Lawton, "Machine-to-Machine Technology gears up for growth", 2004, pp. 12-15, IEEE Computer Society.
International Search Report and Written Opinion for International Patent Application No. PCT/US2014/023632 dated Jun. 23, 2014.
Office Communication for U.S. Appl. No. 14/740,053 dated Jul. 29, 2015.
Office Communication for U.S. Appl. No. 14/204,907 dated Jul. 10, 2015.
International Search Report and Written Opinion for International Patent Application No. PCT/US2015/042993 dated Nov. 11, 2015.
Office Communication for U.S. Appl. No. 14/204,907 dated Dec. 2, 2015.
Official Communication for U.S. Appl. No. 15/156,254 dated Aug. 3, 2016.
Official Communication for U.S. Appl. No. 15/083,214 dated Oct. 25, 2016.
Office Communication for U.S. Appl. No. 14/740,053 dated Jan. 21, 2016.
Office Communication for U.S. Appl. No. 14/204,907 dated Feb. 24, 2016.
Official Communication for U.S. Appl. No. 15/083,214 dated Jul. 7, 2016.
Official Communication for U.S. Appl. No. 15/201,063 dated Nov. 2, 2016.
Official Communication for U.S. Appl. No. 15/156,254 dated Dec. 30, 2016.
Official Communication for U.S. Appl. No. 15/083,214 dated Jan. 9, 2017.
Official Communication for U.S. Appl. No. 15/156,254 dated May 5, 2017.
Official Communication for U.S. Appl. No. 15/083,214 dated Feb. 9, 2017.
Official Communication for U.S. Appl. No. 14/814,283 dated Jun. 9, 2017.
Official Communication for U.S. Appl. No. 15/201,063 dated Apr. 21, 2017.
Official Communication for U.S. Appl. No. 14/814,283 dated Nov. 30, 2015.
Official Communication for U.S. Appl. No. 14/814,283 dated Jun. 3, 2016.
Official Communication for U.S. Appl. No. 14/814,283 dated Nov. 21, 2016.
Asguard Networks, Inc., "SimpleConnectTM Product Information," Retrieved on Nov. 9, 2012, from http://www.asguardnetworks.com/product (1 page).
Asguard Networks, Inc., "Welcome to Asguard Networks," Retrieved on Oct. 23, 2012, from http://www.asguardnetworks.com/ (1 page).
Asguard Networks, Inc., "SimpleConnectTM Quick Start Documentation Guide," Revision 1, Dec. 13, 2012 (18 pages).
Henderson, T. et al., "HIP-based Virtual Private LAN Service (HIPLS)," Network Working Group; Internet-Draft, The Boeing Company, Nov. 6, 2012 (16 pages).
International Search Report and Written Opinion for International Patent Application No. PCT/US2014/023632 dated Jun. 23, 2014 (13 pages).
Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news (2 pages).

(56) References Cited

OTHER PUBLICATIONS

Trusted Computing Group, Incorporated, "TCG Trusted Network Connect: IF-MAP Metadata for ICS Security," Specification Version 1.0, Revision 44, May 8, 2014 (64 pages).
Office Communication for U.S. Appl. No. 14/740,053 dated Jul. 29, 2015, (10 pages).
Office Communication for U.S. Appl. No. 14/204,907 dated Jul. 10, 2015, (20 pages).
Aoyagi, S. et al., "ELA: A Fully Distributed VPN System Over Peer-to-Peer Network," Proceedings of the 2005 Symposium on Applications and the Internet, 2005, IEEE, Computer Society (4 pages).
Benyamina, D. et al., "Wireless Mesh Networks Design—A Survey," IEEE Communications Survey & Tutorials, vol. 14, No. 2, Second Quarter 2012, pp. 299-310.
International Search Report and Written Opinion for International Patent Application No. PCT/US2015/042993 dated Nov. 11, 2015, 11 pages.
Office Communication for U.S. Appl. No. 14/204,907 dated Dec. 2, 2015, (14 pages).
Official Communication for U.S. Appl. No. 15/156,254 dated Aug. 3, 2016, (13 pages).
Trusted Computing Group (Architects Guide; ICS Security Using TNC Technology, Oct. 2013, (6 pages).
Official Communication for U.S. Appl. No. 15/083,214 dated Oct. 25, 2016, (11 pages).
Office Communication for U.S. Appl. No. 14/740,053 dated Jan. 21, 2016, (18 pages).
Office Communication for U.S. Appl. No. 14/204,907 dated Feb. 24, 2016, (20 pages).
Official Communication for U.S. Appl. No. 15/083,214 dated Jul. 7, 2016, (11 pages).
Official Communication for U.S. Appl. No. 15/083,214 dated Jan. 9, 2017, (5 pages).
Official Communication for U.S. Appl. No. 15/156,254 dated Dec. 30, 2016, (13 pages).
Official Communication for U.S. Appl. No. 14/814,283 dated Nov. 30, 2015, (8 pages).
Official Communication for U.S. Appl. No. 14/814,283 dated Jun. 3, 2016, (10 pages).
Official Communication for U.S. Appl. No. 14/814,283 dated Aug. 23, 2016, (7 pages).
Official Communication for U.S. Appl. No. 14/814,283 dated Nov. 21, 2016, (10 pages).
Official Communication for U.S. Appl. No. 15/201,063 dated Apr. 21, 2017, (14 pages).
Official Communication for U.S. Appl. No. 15/201,063 dated Nov. 2, 2016, (11 pages).
Official Communication for U.S. Appl. No. 15/156,254 dated May 5, 2017, (13 pages).
Official Communication for U.S. Appl. No. 15/083,214 dated Feb. 9, 2017, (10 pages).
Official Communication for U.S. Appl. No. 14/814,283 dated Jun. 9, 2017, (18 pages).
Official Communication for U.S. Appl. No. 15/987,762 dated Sep. 12, 2018, pp. 1-24.
Official Communication for U.S. Appl. No. 15/670,925 dated Apr. 5, 2018, pp. 1-10.
Official Communication for U.S. Appl. No. 15/156,254 dated May 14, 2018, pp. 1-17.
Official Communication for U.S. Appl. No. 15/924,148 dated Jun. 5, 2018, pp. 1-24.
Official Communication for U.S. Appl. No. 15/994,760 dated Oct. 1, 2018, pp. 1-22.

\* cited by examiner

HORIZONTAL SWITCH SCALABILITY VIA LOAD BALANCING

CROSS-REFERENCE TO RELATED APPLICATION(S)

This Utility Patent Application is a Continuation of U.S. patent application Ser. No. 15/201,063 filed on Jul. 1, 2016, issued as U.S. Pat. No. 9,729,581 on Aug. 8, 2017, the benefit of which is claimed under 35 U.S.C. § 120, and which is further incorporated by reference in its entirety.

TECHNICAL FIELD

The present invention relates generally to network management, and more particularly, but not exclusively, to managing network communication in an industrial networking environment.

BACKGROUND

Industrial equipment, such as manufacturing equipment used to build or assemble products, may be supported by an industrial networking and/or communications network. In industrial networks, operations of machines that control industrial processes (e.g., manufacturing, machining, stamping, product packaging, or the like) may be arranged to communicate with other machines and/or computers over the industrial network. In some cases, such communication may be related to supervising and controlling operations of the various industrial machines. Also, the industrial network may be used for collect data from the industrial machines for monitoring a manufacturing or assembly process, monitoring and improving operational efficiency and throughput, quality control, or the like.

In some cases, the communication/network protocols used in industrial communications networks may differ from, or be incompatible with, standard communications protocols used for business networks. In some cases this establishing connectivity relationships between the two types of networks challenging. In addition, many industrial communication systems were not designed with information security in mind, but now require secure connectivity to be compatible with business network security protocols, or to be compliant with regulatory standards. Also, as more and more industrial environment become networked, industrial communication system may be required to scale. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
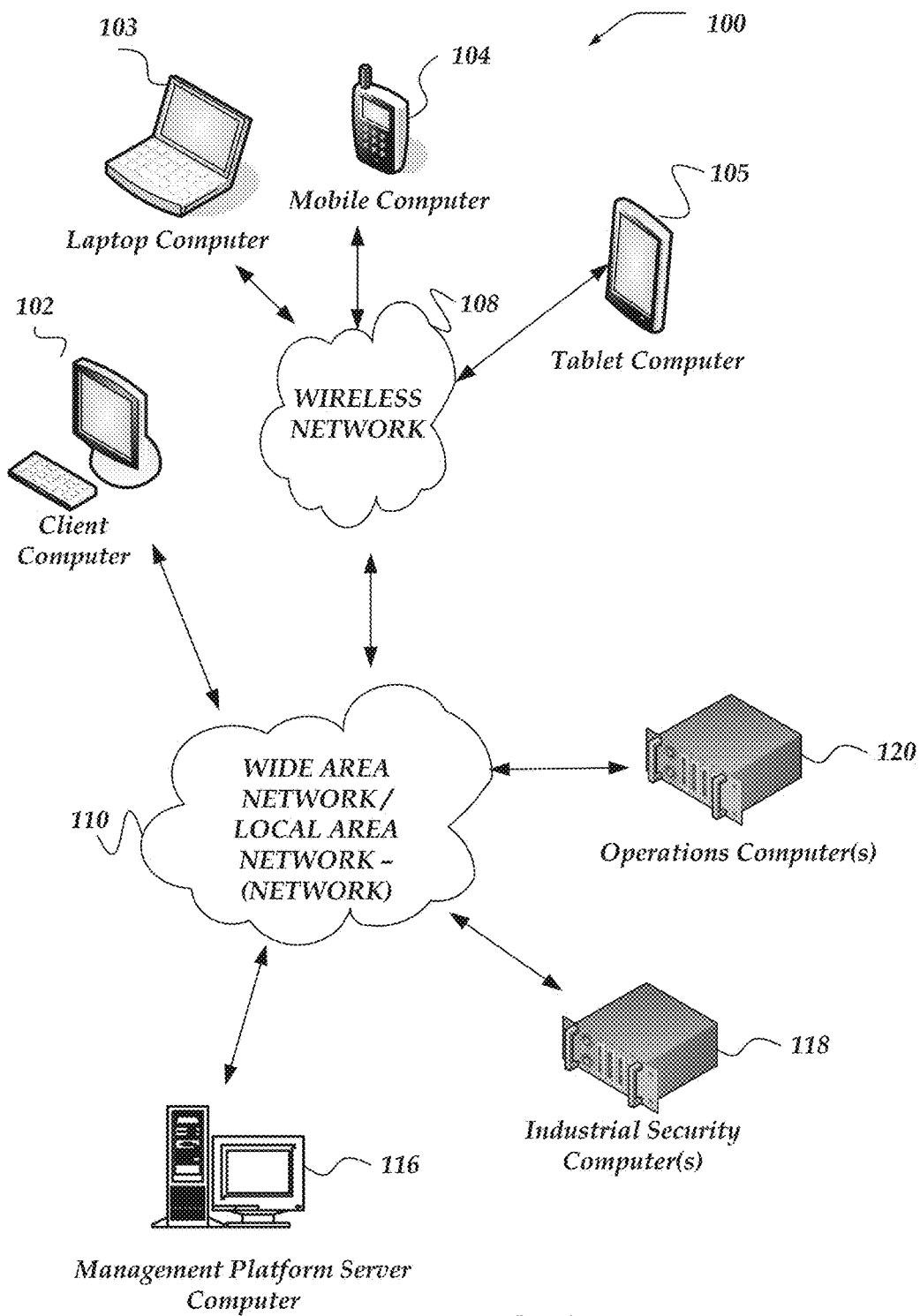
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "mesh network," "industrial network" refer to a network of industrial computer/machines, workstations, client computers, gateway computers, traffic management devices, network monitoring computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as mesh networks even when their topology and/or configuration is not strictly a "mesh" network and/or partial "mesh" network.

As used herein the term "physical network" refers to the actual industrial communication network that interconnects one or more industrial machines/computers. The physical network may be a physical and/or native network device/components used to connect one or more industrial computers and/or industrial devices (machine) in a factory/industrial complex. Physical networks include network interfaces, wire, wireless hotspots, switches, routers, repeaters, or the like, that comprise the physical network Also, physical networks may be considered to include the native communication protocols, network topology, and so on, that may be used to setup a mesh network in an industrial environment. In some cases, physical networks may be arranged to enable open communication between node computers, (e.g., machines, workstations, and so on), gateway computer, or the like, that are on the physical network.

As used herein the terms "node," and "node computer" refer to computers that are endpoint computer interconnected over a physical network. Node computers may include client computers, network computers, industrial workstations, press machines, robots, packaging machines, automated milling machines, automated printing presses, pumps, valves, boilers, or the like. Node computers are considered to be computer/device connected to the physical network exclusive of gateway computers, network monitoring computer, and traffic management devices.

As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/mesh network. These intended recipients of these communication may be considered target node computers. Accordingly, a node computer may be a target node computer if it receives communications and it may be a source node computer if it sends communications.

As used herein the terms "gateway," "gateway computer, "industrial security computer," and "industrial security appliance" refer to computers connected to an industrial network that are disposed between the node computers and the physical network. Gateway computers may be network computers that may be arranged to provide security, access control, communication routing, or the like, for the mesh network. In some embodiments, gateway computer may be configured by another network computer, such as, a management platform computer.

As used herein the terms "target gateway," and "target gateway computer" refer to one or more gateway computers that are disposed between the target node computers that may be the intended recipients of a communication in a mesh network.

As used herein the term "management platform computer," "management platform server computer" refer to one or more network computers that may be arranged to provide administrative and/or configuration services to one or more computer, such as, gateway computers, that may be in a mesh network.

As used herein the term "traffic management device (TMD)" refers to a computer that may be arranged to monitor and managed network traffic that, in most cases, flows through the traffic management device. Traffic management devices, may be firewalls, application delivery computers, proxying devices, caching computers, load balancers, or the like, or combination thereof. In some cases, traffic management devices may actively control and/or direct one or more network connection flows that are provided to it. In some embodiments, a gateway computer may be arranged to perform one or more functions of a TMD.

As used herein the term "network monitoring computer (NMC)" refers to a network computer that may be arranged to passively monitor communication (e.g., network traffic, network packets). NMCs may be installed/configured such that they are provided network traffic information even though the NMC may not be disposed between participants of the communication. NMCs may monitor the content of the network traffic and generate notifications, logs, or the like, as appropriate. For example, in some embodiments, a NMC may be an intrusion detection computer that is arranged to detect malicious and/or suspicious activity by passively observing traffic on a network. In some embodiments, a gateway computer, or a TMD may be arranged to perform NMC functions.

As used herein the term "overlay network" refers to logical networks that may be overlaid on a physical network. Overlay networks may be comprised of one or more virtual private LAN segments, systems of VPN tunnels, other communication tunnels, or the like. Overlay networks may be generated by one or more gateway computers that enforce one or more virtual or emulated intercommunication path between endpoints (e.g., node computers. gateway computer, TMDs, NMCs, or the like) in a mesh network. In some embodiments, overlay networks may be statically defined. Or, in some embodiments, overlay networks may be dynamically generated depending on the type of endpoints, communication, users, or the like.

Endpoints, such as, node computers that may be restricted to an overlay network, may only see other computers/devices that are also on the same overlay network. In some embodiments, endpoints, may be included in more than one overlay network at the same time. Also, some endpoints may be arranged to directly access physical networks for some types of communication and use overlay networks for other types of communication.

As used herein the terms "network path," and "path" refer to a particular route between one or more endpoints through a physical network. A network path for given communication may be determined and/or enforced by a gateway computer. In some cases, network paths may be defined statically, in other cases, network paths may be determined dynamically.

As used herein the term "gateway identifier," or "GID" refer to identifiers used by a management platform server computer to identify gateway computers and/or gateway computer groups. A GID may be used to identify target gateway computers or a target group of gateway computers. From the perspective of a client or source gateway computer, a GID represents a single target gateway. However, in some cases a GID may reference a group of target gateway computers rather than just one. If a GID represents a group of gateway computers, a TMD or other mechanism may be arranged to determine a particular target gateway computer from among group members.

As used herein the term "gateway key," or "target gateway key" refer to value generated by a TMD that may be used by the TMD to persistently route communication traffic to a particular target gateway computer that may comprise a group or cluster of gateway computers.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing secure communication over a network. In at least one of the various embodiments, if a source node sends a communication to a target node, a source gateway may be arranged to perform various actions to forward the communication to the target node.

In at least one of the various embodiments, the source gateway may be arranged to provide a gateway identifier (GID) that may be associated with one or more target gateways that may be associated with the target node. In at least one of the various embodiments, the GID may be comprised of a data structure that may be compatible with one or more standard network address structures.

Further, the source gateway may be arranged to embed marker information that includes at least a portion of the GID in the communication. In some embodiments, providing the gateway key may include providing tuple information that may be associated with the communication and including the tuple information and the marker information in the gateway key.

In at least one of the various embodiments, the marker information may be embedded in the security parameters index field of an Internet Protocol Security (IPSEC) packet.

In some embodiments, if the GID may be associated with more than one target gateways, one or more traffic management devices (TMDs) may perform various actions.

In at least one of the various embodiments, the TMD may be arranged to select one target gateway from the more than one target gateways based on one or more traffic management policies. Also, in at least one of the various embodiments, the TMD may be arranged to provide a gateway key that corresponds to a network flow that may be associated with the communication. This gateway key may be made from at least a portion of the communication and the marker information.

In at least one of the various embodiments, the TMD may be arranged to associate the gateway key with the selected target gateway.

And, in at least one of the various embodiments, the TMD may be arranged to provide the communication to the selected target gateway that provides the communication to the target node.

In at least one of the various embodiments, if the gateway key may have been previously associated with the network flow, the TMD may provide the selected target gateway based on the gateway key and then provide the communication to the selected target gateway.

In at least one of the various embodiments, the source gateway may be arranged to provide a network address of the one or more target gateways based on the GID that may be associated with the one or more target gateways.

In at least one of the various embodiments, the gateway key may be stored in a hardware cache of the traffic management device. Also, in some embodiments, tuple information for the selected target gateway may be associated with the tuple information of the selected target gateway stored in the hardware cache of the TMD.

In at least one of the various embodiments, if the GID is associated with just one target gateway, the communication maybe provided to the one target gateway.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Management Platform Server Computer 116, Industrial Security Computer(s) 118, Operations Computer(s) 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, management platform server computer 116, industrial security computers 118, operations computers 120, or other computers.

Client computers 102-105 may further be configured to include a client application that enables an end-user to log into an end-user account that may be managed by another computer, such as management platform server computer 116, industrial security computers 118, operations computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates management platform server computer 116, industrial security computers 118, operations computers 120 each as a single computer, the innovations and/or embodiments are not so limited. For example, one or more functions of management platform server computer 116, industrial security computers 118, operations computers 120, or the like, may be distributed across one or more distinct network computers. Moreover, management platform server computer 116, industrial security computers 118, operations computers 120 are not limited to a particular configuration such as the one shown in FIG. 1. Thus, in one embodiment, management platform server computer 116, industrial security computers 118, operations computers 120 may be implemented using a plurality of network computers. In other embodiments, server computer may operate as a plurality of network computers within a cluster architecture, a peer-to-peer architecture, or the like. Also, in some embodiments, one or more processors on one or more network computers may be arranged to perform one or more actions of management platform server computer 116, industrial security computers 118, operations computers 120, or the like. Further, in at least one of the various embodiments, management platform server computer 116, industrial security computers 118, operations computers 120 may be implemented using one or more cloud instances in one or more cloud networks.

Also, in at least one of the various embodiments, one or more management platform server computers, or at least some or all of the features thereof, may be incorporated in an industrial security computer, such as, industrial security computer 118, or an operation computer, such as, operations computer 120. Accordingly, these innovations and embodiments are not to be construed as being limited to a single environment, and other configurations, and architectures are also envisaged.

Illustrative Client Computer

Figure 2:
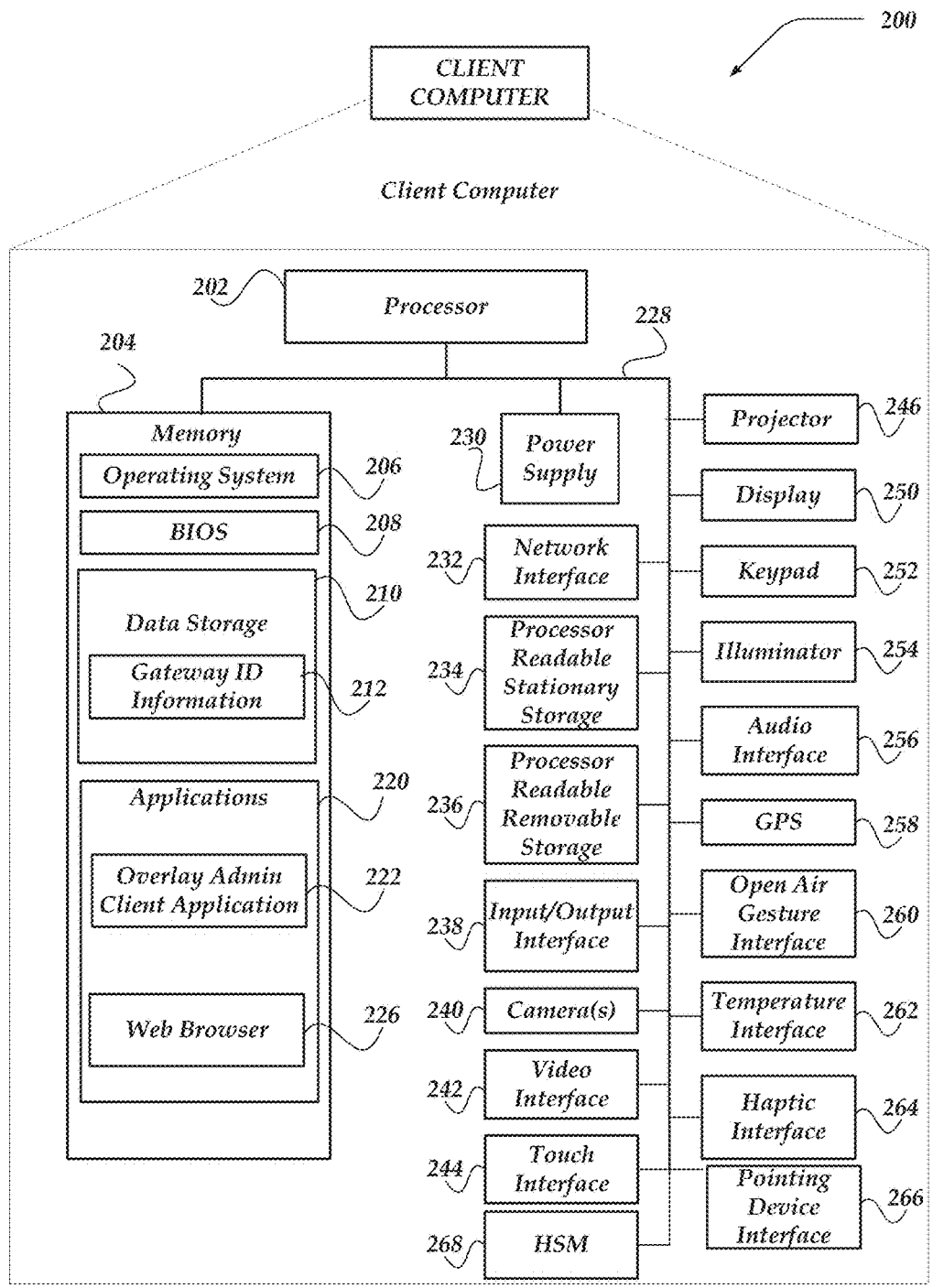
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Storage 210 may include gateway identifier information 212. Gateway identifier information 212 may include two more identifiers that may be used by other computers to locate/identify a particular gateway computer to use. Gateway identifier information 212 may include an identifier for the individual gateway computer and/or an identifier associated with a gateway group that the gateway computer may be part of.

Applications 220 may include computer executable instructions which, when executed by client computer 200, transmit, receive, and/or otherwise process instructions and data. Applications 220 may include, for example, overlay administration client application 222. In at least one of the various embodiments, overlay administration client application 222 may be used to exchange communications to and from management platform server computer 116, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
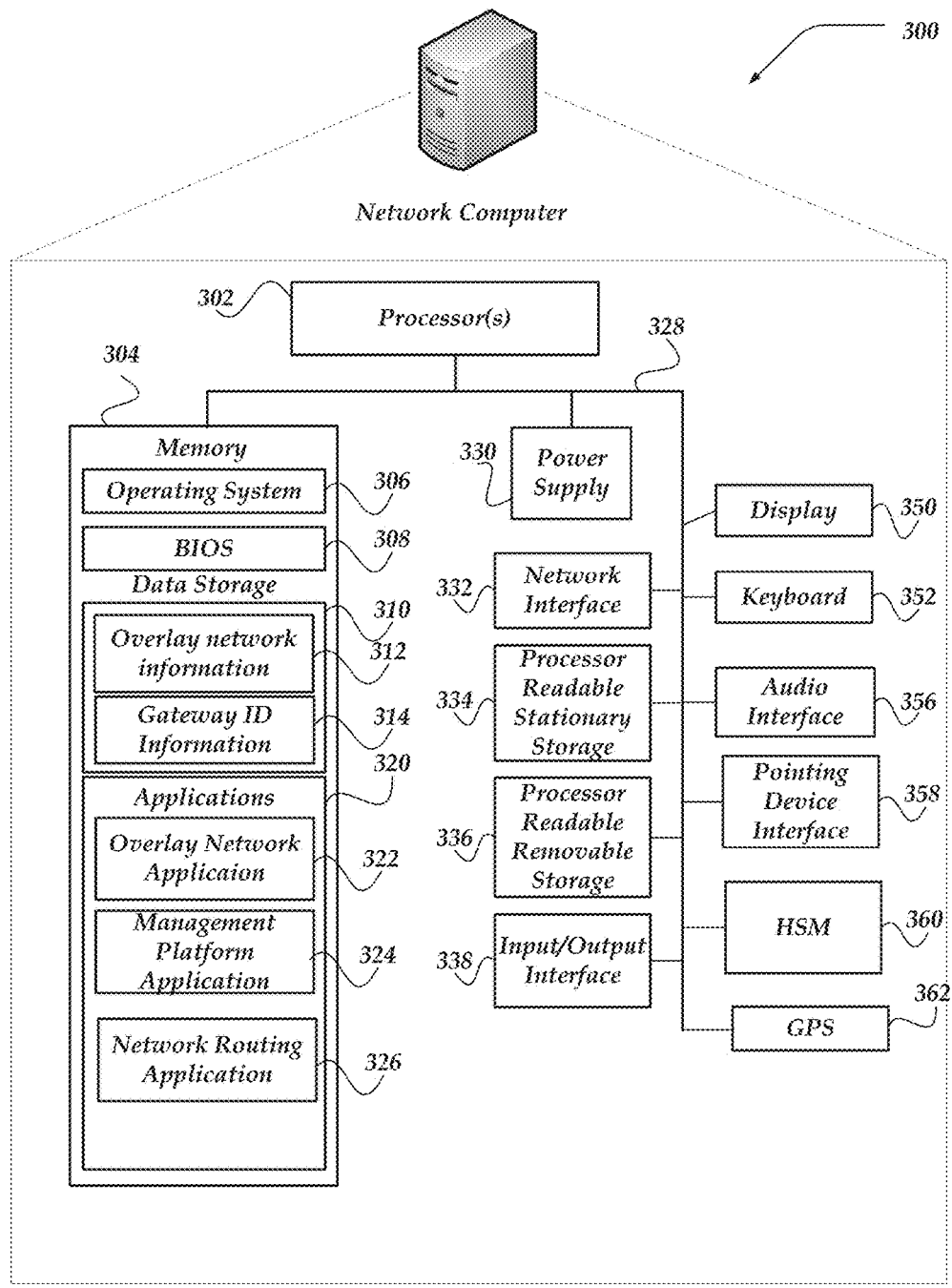
FIG. 3 shows one embodiment of a network computer, in accordance with at least one of the various embodiments.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of at least one of management platform server computer 116, industrial security computer(s) 118, or industrial operations computer(s) 120 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 312, or the like. Overlay network information 312 may contain various data generated for defining overlay networks, such as, routing information, and one or more policies associated with one or more mesh networks. Data storage 310 may include gateway identifier information 314. Gateway identifier information 314 may include two more identifiers that may be used by other computers to locate/identify a particular gateway computer to use. Gateway identifier information 314 may include an identifier for the individual gateway computer and/or an identifier associated with a gateway group that the gateway computer may be part of.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network application 322, management platform application 324, and/or network routing application 326 which may be enabled to perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, overlay network application 322, management platform application 324, and/or network routing application 326 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to overlay network application 322, management platform application 324, and/or network routing application 326 may be provisioned and de-commissioned automatically.

Also, in at least one of the various embodiments, overlay network information 312, or the like, may located in virtual servers running in a cloud-based computing environment rather than being tied to one or more specific physical network computers.

Overlay network administration application 322 may be a process or service that is arranged to communicate with one or more industrial security computers, such as, industrial computers 118, and/or one or more operations computers, such as, operations computers 120. Likewise, management platform application 324 may be a process or service that is arranged to communicate with one or more industrial security computers, such as, industrial computers 118, and/or one or more operations computers, such as, operations computers 120. Further, in at least one of the various embodiments, the overlay network administration application 322 and/or management platform application 324 may be arranged to provide configuration information to one or more of industrial computers 118, or operations computers 120. Also, in at least one of the various embodiments, the overlay network administration application 322 and/or management platform application 324 may be arranged to obtain notifications, logging information, status reports, security alerts, or the like, or combination thereof, from one or more of industrial computers 118, or operations computers 120.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
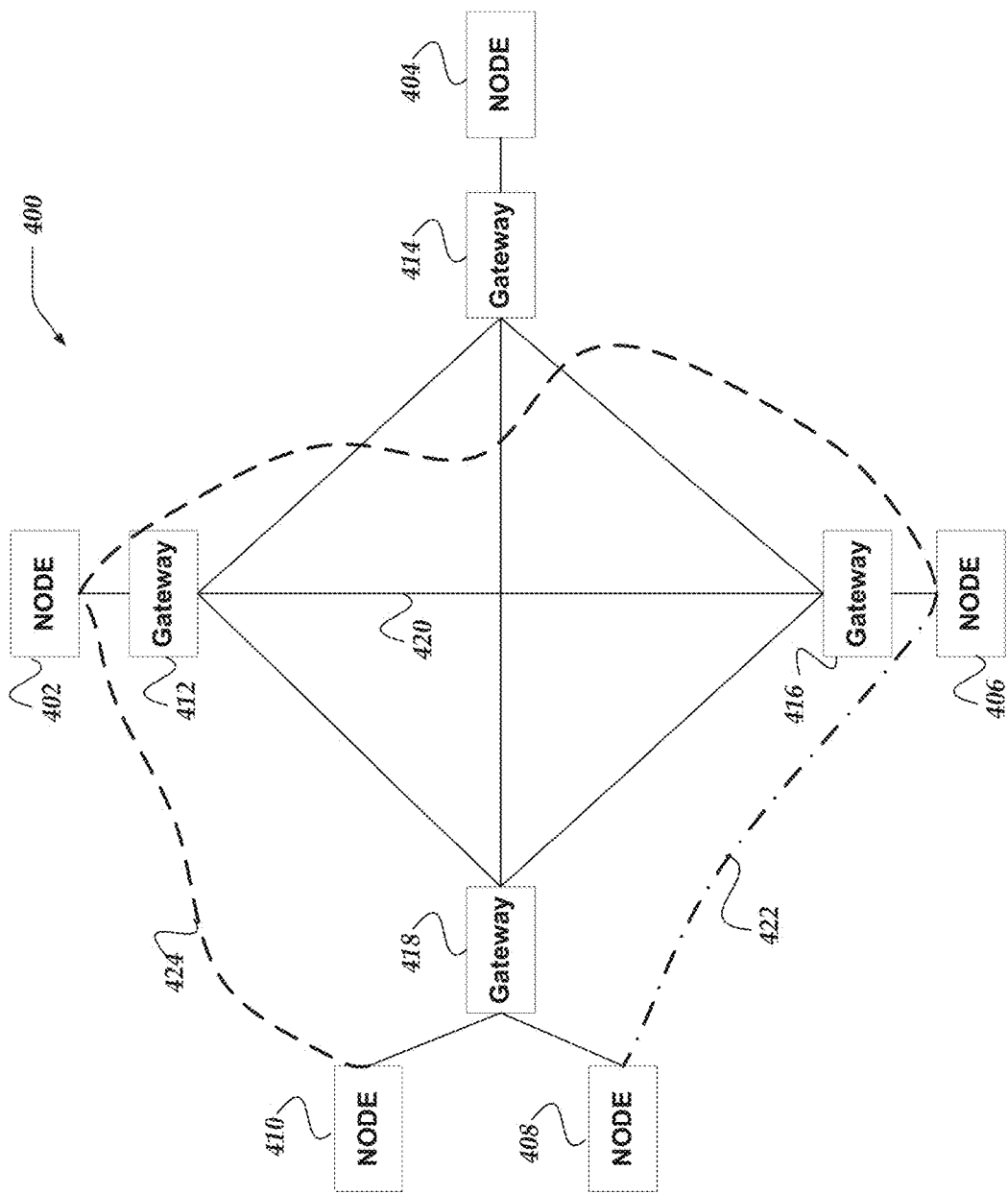
FIG. 4 illustrates a logical schematic of a mesh network that includes overlay networks and gateways, in accordance with at least one of the various embodiments.

FIG. 4 illustrates a logical schematic of mesh network 400 that includes overlay networks and gateways, in accordance with at least one of the various embodiments. Mesh network 400 is arranged to include gateway computers, such as, gateway computers 412-418. Gateway computers may be disposed between one or more nodes and the underlying physical network infrastructure. In at least one of the various embodiments, the gateway computers may be arranged such that they isolate node computers, such as, nodes 402-410 from the physical network used to interconnect them, In this example, physical network 420 represents the underlying physical network comprising mesh network 400. Node 404 is isolated from physical network 420 by gateway 414. Accordingly, in at least one of the various embodiments, the gateway computers may be configured to provide and/or enforce one or more overlay networks in mesh network 400. In this example, for some embodiments, overlay network 422 enables node 406 and node 408 to "see" each other on the network; communication from node 406 to node 408 may be routed through gateway computer 416 over a segment of network 420 to gateway computer 418; and the communication may then be routed from gateway computer 418 to node 408. From the point-of-view of node 406 and node 408 the communication goes directly over overlay network 422. In actuality the communication will be routed through physical network 420 between gateway computer 416 and gateway computer 418 using a particular network path through physical network 420 that may be statically and/or dynamically determined.

Likewise, in this example, mesh network 400 may be arranged, such that node 402, node 406, and node 410 communicate over overlay network 424. As described above, in at least one of the various embodiments, the communication among/between the nodes on overlay network 424 may be routed along a particular network path through physical network 420 and two or more of the gateway computers.

In at least one of the various embodiments, some nodes may be configured to use physical network 420 directly rather than using an overlay network. For example, in mesh network 400, node 404 is not associated with an overlay network so it may be arranged to communicate directly on physical network 420 absent the abstraction of an overlay network.

In at least one of the various embodiments, the gateway computers may be configured with one or more rule-based policies that determine access and/or restrictions for network communication on the networks. The particular rules and/or restrictions associated with how communication information (e.g., network packets) should be routed through the mesh network may be established by a management platform computer, such as management platform server computer 116, or the like. Configuration information may be pushed (e.g., router tables) to each gateway computer to define the overlay networks, if any, as well other restrictions that may be applicable for the mesh network.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the mesh network through gateway computer 418. Conversely, node computers, or any other computer for that matter, not in a gateway computer's whitelist may be denied access to that gateway computer and the mesh network. Though, in some embodiments, a node computer may be allowed to access one or more particular gateway computers and denied accessed to others. In at least one of the various embodiments, a management platform computer (not shown in FIG. 4) may be arranged to manage and distribute the whitelists to each gateway computer comprising a mesh network.

In at least one of the various embodiments, by placing gateway computers between physical network 420 and the node computers, the configuration and/or definition of one or more overlay networks may be accomplished without requiring the individual node computers to be reconfigured. Further, in at least one of the various embodiments, gateway computers may comprise industrial security computers that enable various routing, security and/or cryptography features to help secure the mesh network. Otherwise, in at least one of the various embodiments, the mesh network may be reliant on the security features of the node computers themselves which may be non-existent or very limited.

In at least one of the various embodiments, overlay networks may be enforced by using an overlay whitelist that defines the endpoints (e.g., node computer, gateway computers, or the like) that may be accessed from other members of the overlay network. Accordingly, in at least one of the various embodiments, the computers on a given overlay may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, a management platform computer (not shown in FIG. 4) may be arranged to manage and distribute the overlay whitelists to each gateway computer comprising a mesh network.

Figure 5:
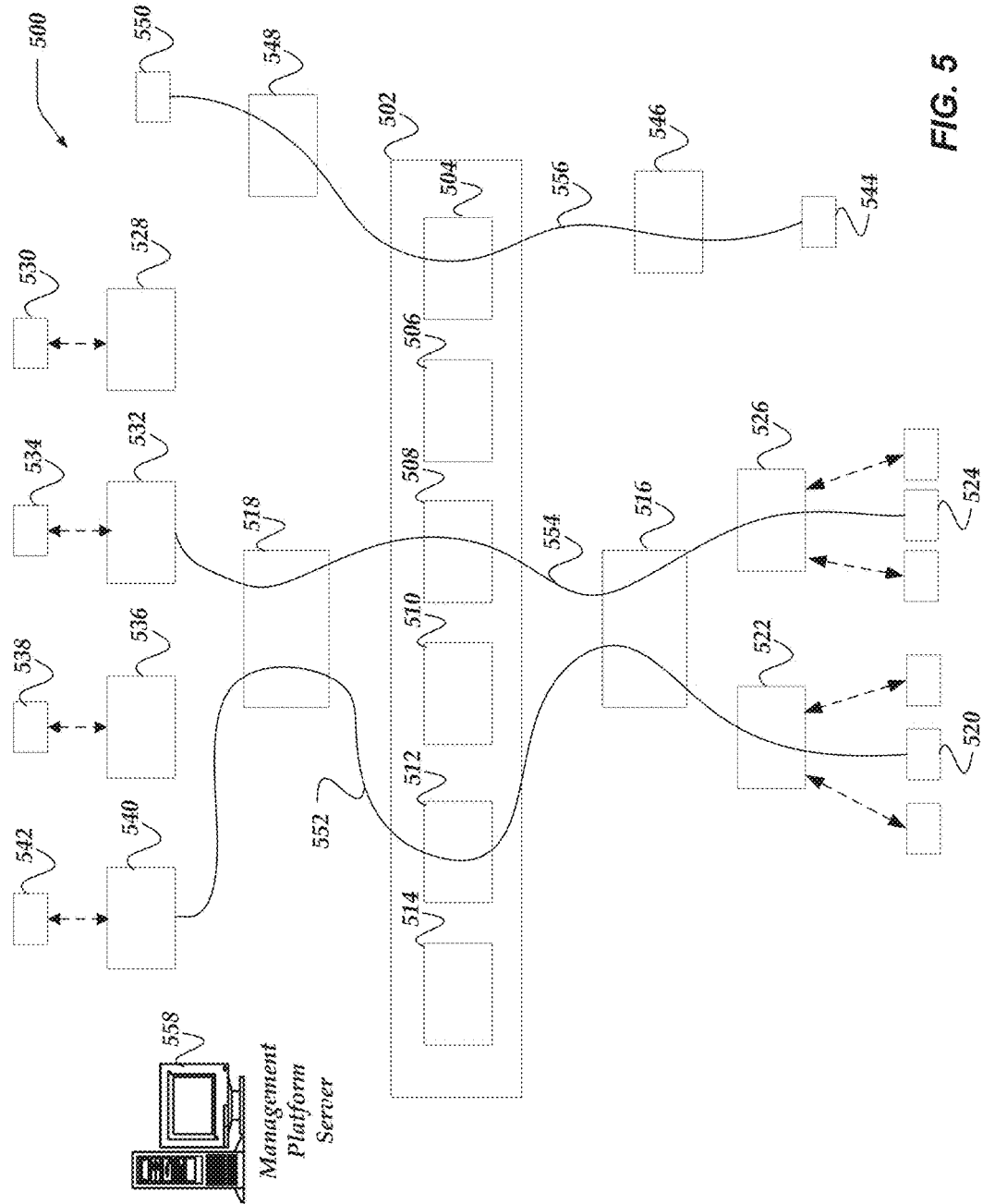
FIG. 5 illustrates a portion of a logical architecture of a system for horizontal switch scalability by way of load balancing in accordance with at least one of the various embodiments.

FIG. 5 illustrates a portion of a logical architecture of system 500 for horizontal switch scalability by way of load balancing in accordance with at least one of the various embodiments. In at least one of the various embodiments, there may be so much network communication that a single gateway computer may be unable to process the communication. Accordingly, in at least one of the various embodiments, the load may have to be shared among two or more separate gateway computers (virtual or physical). Accordingly, more than one gateway computer may be arranged into a group of gateway computers, such as, group 502.

In at least one of the various embodiments, a group of gateway computers may be arranged to share the load and/or pool their resources to process communication from other gateway computers and/or their node computers. In at least one of the various embodiments, groups, such as, group 502 may be arranged to appear as a single gateway computer. In this non-limiting example, group 502 includes five gateway computers (gateway 504-514). Accordingly, in this example the five gateway computers may have the capability to process more communication traffic than a single gateway computer. However, since the five gateway computers are arranged into a group, they may appear to be a single gateway to other gateways and/or devices on the network.

In at least one of the various embodiments, a traffic management device, such as, traffic management device 516 may be disposed between group 502 and other gateway computers. In at least one of the various embodiments, traffic management device 516 may be arranged to execute one or more rule based policies for distributing (e.g., load balance) communication among the gateway computers that comprise the group.

In at least one of the various embodiments, one or more other traffic management devices, such as, traffic management device 518 may be arranged to manage communication between the group gateway computers. In some embodiments, the same traffic management devices may be arranged to perform both 'directions' of communication.

In at least one of the various embodiments, other gateway computers, such as, gateway computer 522 and/or gateway computer 526 may be coupled with one or more nodes, such as, node 520 (coupled to gateway computer 522) and node 524 (coupled to gateway computer 526). FIG. 5 shows three nodes coupled to gateway computer 522 and three nodes coupled to gateway computer. In production environments, there may be fewer or more nodes, in some cases, there may be many more nodes coupled with a given gateway.

Likewise, in some embodiments, other gateway computers, such as, gateway computers 528, 532, 536, and 540 may be included in system 500. Also, in at least one of the various embodiments, one or more gateway computers may be coupled with nodes, such as, node 530, node 534, node 538, node 542, or the like. In this example, gateway computers 528, 532, 536, and 540 communicate with group 502 through a traffic management device, such as, traffic management device 518. However, in some other embodiments one or more gateway computers may be arranged to communicate directly with one or more of the group member gateway computers.

For example, in some embodiments, a node, such as, node 544 may be coupled to a gateway computer, such as gateway computer 546. Likewise, in some embodiments, gateway computer 548 may be coupled to node 550. Also, in at least one of the various embodiments, there may be a management platform server, such as management platform server 558 that is part of system 500.

In at least one of the various embodiments, each of the gateway computers and the management platform server may be considered to be interconnected using a network, including a mesh network that provides network links to each computer on the network. Referring to FIG. 4, gateway computer 414 may be considered analogous to gateway computer 540, or the like. Likewise, in this example, node 406 may be analogous to node 542 in FIG. 5.

In some embodiments, a node, such as node 520 may be arranged to communicate with node 542. Accordingly, since in this example, node 520 and node 542 are restricted from communicating with each other directly, they may employ gateway computers, such as gateway computer 522, and gateway computer 540 to act as intermediary devices to facilitate their communication. In this example, network path 552 represents a path through the networks from node 520 to node 424.

Following this example, node 520 may communicate to gateway computer 522 which may in turn forward the communication to traffic management device 516. In this example, traffic management device 516 may be arranged to provide a single network address that represents the pool of gateway computers that comprise group 502. Accordingly, in this example, traffic management device 516 may employ rule based policies to determine which gateway computer in the group to employ for the communication. In this example, gateway computer 512 may be selected by the traffic management device. Next, in this example, gateway computer 512 may forward the communication to traffic management device 518. From traffic management device 518, the communication may be provided to gateway computer 540, and ultimately to the target node, node 542. Similarly, network path 552 may be traversed to provide a response communication from node 542 to node 520 (if necessary).

Similarly, in this example, network path 554 shows how a communication from node 524 may be passed through gateway computer 526; to traffic manager 516; to gateway computer 508 (instead of gateway computer 512); to traffic management device 518; to gateway computer 532; and to node 534.

Also, in this example, network path 556 shows a communication that may be routed directly to gateway computer 504 bypassing the traffic management device. In this example, node 544 communicates with gateway computer 546 which forwards the communication to gateway computer 504; to gateway computer 548; and finally to node 550.

In at least one of the various embodiments, gateway computers may be identified using Gateway Identifiers (GIDs). Accordingly, each gateway computer may be addressed separately using its individual GID. Likewise, in at least one of the various embodiments, groups of gateway computers, such as, group 502 may be arranged to have single GID that represents the groups as a whole. Accordingly, in at least one of the various embodiments, if a communication is routed to a gateway computer via a GID, it may be routed to a single gateway computer or a group of gateway computers depending on the GID. Accordingly, in some embodiments, if the GID is associated with a group of gateway computers, a traffic management device may be arranged to select the particular gateway computer that may process the communication.

In at least one of the various embodiments, if the communication to a group is establishing a connection (rather than being part of an ongoing session) the traffic management device may be arranged to select a gateway computer in the group based on one or more rule based policies. For example, the traffic management device may be arranged to apply policies that are designed to load balance the communication across the separate gateway computers that comprise a group. Various metrics that may be available to a traffic management device may be employed for determining performance based load balancing. In other embodiments, the communications may be balanced using round-robin techniques, or the like. Likewise, in at least one of the various embodiments, distribution of communication across group members may be based on application type, source/target priority, capacity of individual gateway computers, source/target behavior patterns, or the like, or combination thereof.

For example, in at least one of the various embodiments, gateway computer 522 (using path 552) may be trying to communicate to gateway computer 540 through group 502. Accordingly, in this example, the communication from gateway computer 522 may be directed based on a GID corresponding to group 502 and then based on a GID that corresponds to gateway computer 540.

In this example, for one or more reasons, traffic management device 516 selects gateway computer 512 to handle the communication. In other examples, it may select a different gateway computer, such as, gateway computer 514. In at least one of the various embodiments, the particular group member selection will be based on the traffic management policy rules of the traffic management device that may be servicing the group.

In at least one of the various embodiments, if a connection is being established, the traffic management device for a group may select any group member based on the policy rules being applied. However, once the connection is established, the traffic management device may be arranged to maintain flow consistency and attempt to use the same selected gateway computer for the duration of a connection. In some embodiments, maintaining flow consistency for at least the duration of a connection may ensure better performance for some network protocols (e.g., TCP/IP) and/or may be a requirement for others (e.g., IPSEC).

Accordingly, in at least one of the various embodiments, the traffic management device may be arranged to generate keys that may be used to associate incoming communications, such as, network packets, with a previously seen connection. In at least one of the various embodiments, the traffic management server may include tuple information along with the GID information to generate a unique key for a particular connection.

In at least one of the various embodiments, the key information may be used to track which group member gateway computer was selected to process the communication. For example, a traffic management device may be arranged to include a lookup table that uses the key information to associate the network address of the selected group member gateway computer with the connection. Thus, if subsequent communications for the same connection are received at the traffic management device, they may be routed to the correct gateway computer based on key information generated from the incoming communications.

In at least one of the various embodiments, a gateway computer, such as, gateway computer 504 may be part of a group, such as, group 502 and remain available for direct routing of communication. In this example, gateway computer 546 may be arranged to communicate to gateway computer 504 using the GID information associated with gateway computer 504 rather than using the GID of group 502.

In at least one of the various embodiments, a management platform server, such as, management platform server computer 558, may be arranged to communicate GID information to gateway computers. Accordingly, in at least one of the various embodiments, it may be arranged to provide gateway computers a group GID as well as an individual GID. Further, in at least one of the various embodiments, management platform servers may be arranged to define groups and define which gateway computers may be included in a group. For example, in some embodiments, management platform server 558 may be arranged to provide a user-interface that enables a user to configure system 500, including defining groups.

Figure 6:
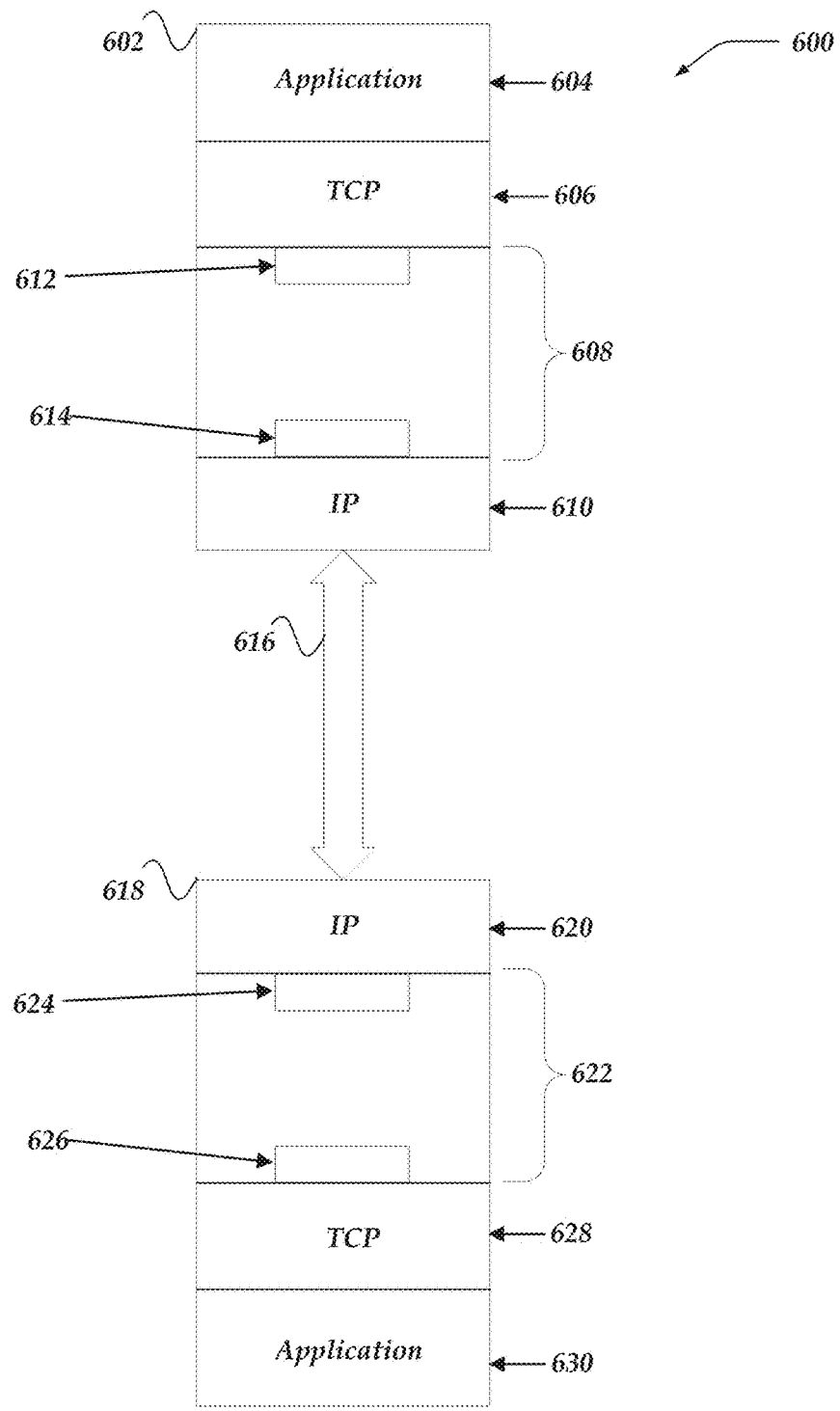
FIG. 6 illustrates a logical representation of a system for communicating in a network in accordance with at least one of the various embodiments.

FIG. 6 illustrates a logical representation of system 600 for communicating in a network in accordance with at least one of the various embodiments. In at least one of the various embodiments, communications that are processed on a gateway computer may comprise various logical layers that may comprise a functional stack. In at least one of the various embodiments, a communication on one gateway computer, such as, communication 602 may be arranged such that an application layer, such as, application layer 604 may perform actions that include communication; next at layer 606, one or more standard network protocols APIs (TCP in this example) may be employed; at layer 608 one or more special actions may be performed to support the overlay networks. And, before the communication is sent out, the lower level layers, such as, layer 610 (IP layer in this example) may be applied.

In at least one of the various embodiments, gateway computers may be arranged to substitute their GID for use as a network address by higher layers such as application layer 604 and TCP layer 606. The GID may be arranged to be compatible with the native data structures that may be used to represent actual network addresses. Accordingly, in at least one of the various embodiments, application level networking API's that accept network address data structures as parameters may be enabled to accept GID instead.

For example, in some embodiments, an internet address may be represented using a 32-bit value. Thus, in such embodiments, the GID may be a 32-bit number, making it size compatible with an ordinary network address value.

In at least one of the various embodiments, at the gateway layer, layer 608 in FIG. 6, the GID of the source gateway and/or the target gateway are mapped to an actual network address. In at least one of the various embodiments, component 612 may represent components that are arranged to map GIDs to network addresses, and component 614 may represent components that are arranged to map from a network address to a GID.

In at least one of the various embodiments, since the GIDs are mapped to an actual network address, a network layer, such as IP layer 610 may generate the appropriate network protocol information for the communication. Accordingly, in at least one of the various embodiments, network path 616 may be employed to communicate the communication network packets to its next destination.

In at least one of the various embodiments, communication 618 represents the received version of communication 602. The network protocol layer (IP layer 620) accepts the communication over the network; gateway layer 622 employs component 624 and component 626 to map network addresses to GIDs; TCP layer 628 performs higher level network protocol actions using the GID in place of the network address; and application layer 630 employs the payload of the communication to perform application specific actions based on the actual contents of the payload.

Figure 7:
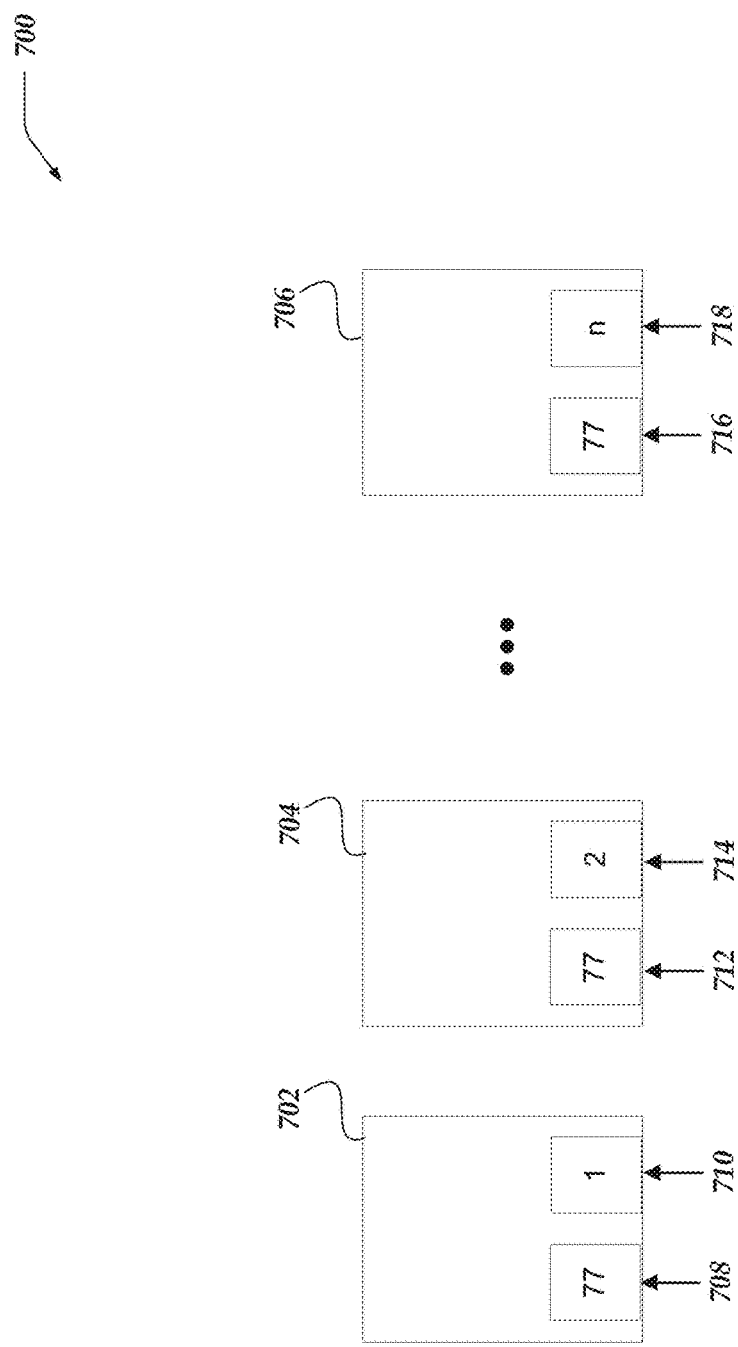
FIG. 7 illustrates a logical schematic of a system that includes grouped gateway computers in accordance with at least one of the various embodiments.

FIG. 7 illustrates a logical schematic of system 700 that includes grouped gateway computers in accordance with at least one of the various embodiments. In at least one of the various embodiments, gateway computers may be associated with more than one Gateway ID (GID). In at least one of the various embodiments, one GID may be used to designate a particular gateway computer while one or more other GIDs may be used to designate a group that the gateway computer may be associated with.

In this example, in at least one of the various embodiments, gateway computer 702, gateway computer 704, and gateway computer 706 represent gateway computers that may be included in a group. Accordingly, in at least one of the various embodiments, each gateway computer has two GIDs. In this example, GID 708, GID 712, and GID 716 represent group GIDs, here with a value of 77. And, in this example, GID 710 represents the individual GID for gateway computer 702; GID 714 represents the individual GID for gateway computer 704; and GID 718 represents the individual GID for gateway computer 706.

In at least one of the various embodiments, a management platform server computer, such as, management platform server computer 116 may be arranged to manage the issues of group GIDs. Accordingly, if a management platform server computer assigns one or more gateway computers to a group it may provide them the group GID.

Figure 8:
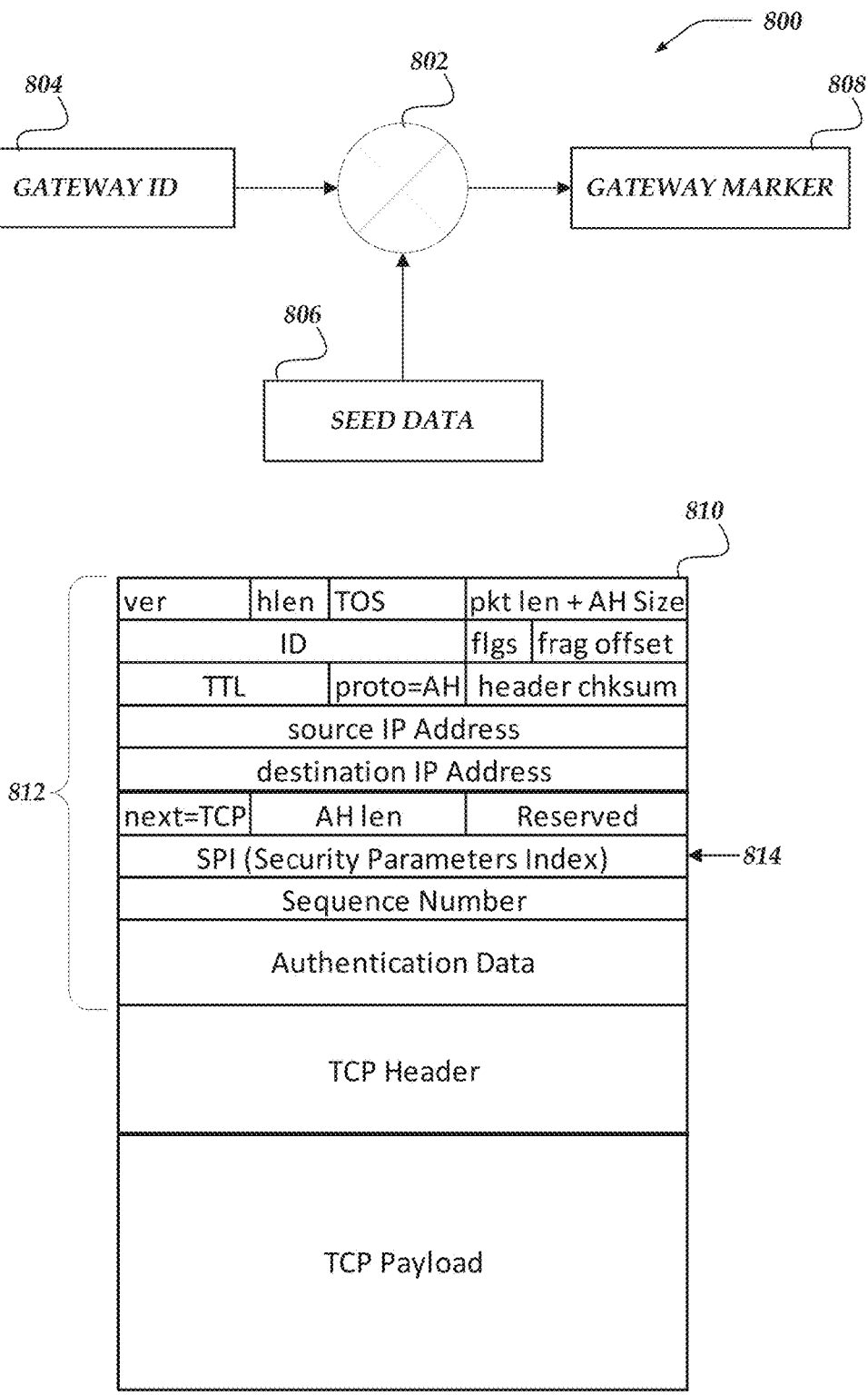
FIG. 8 illustrates a logical representation of a system for generating security parameters index information from a gateway identifier in accordance with at least one of the various embodiments.

FIG. 8 illustrates a logical representation of system 800 for generating marker information from a gateway identifier in accordance with at least one of the various embodiments. In at least one of the various embodiments, standard network protocols may be used to communicate between gateway computers, nodes, or the like. Using standard network protocols enables the system to leverage existing networking infrastructure, including secure systems and cryptographic protocols.

In at least one of the various embodiments, one or more markers may be included in the network packets that comprise the communications to enable a traffic management device to recognize and/or apply policies to gateway computer communications. In at least one of the various embodiments, the markers may be placed such that they are compatible with the underlying network protocol. Also, the markers may be arranged to be visible to the traffic management devices. For example, the markers may be placed in non-encrypted portions of the network payload to enable them to be recognized and/or processed without having to decrypt the network packets.

Further, in at least one of the various embodiments, the markers may be generated to include the GID information of the target gateway computer (or target gateway computer group). This enables the traffic management devices, or the like, to employ the GID information for performing various actions, including routing the communication to the correct group and/or gateway computer.

Accordingly, in at least one of the various embodiments, gateway computers may be arranged to include facilities for generating protocol compatible markers that may incorporate one or more GIDs, such as, transformer 802. In some embodiments, transformer 802 may be arranged to take gateway ID 804 and combine it with seed data 806 to produce gateway marker 808.

In at least one of the various embodiments, seed data 806 may include various information, including cryptographic key information, network address information, random number seeds, or the like, or combination thereof.

In at least one of the various embodiments, network packet 810 is an example of a standards compatible network packet that may be used to communicate between gateway computers. In this example, the network packet represents the well-known structure of an IPSEC packet. According to the IPSEC protocol, the fields for an IPSEC header comprises the fields in header 812. One particular field may be employed to contain marker information, such as, gateway marker 808. Accordingly, in at least one of the various embodiments, transformer 802 may be arranged to generate a marker that suitable for being included in the SPI field of an IPSEC header. One of ordinary skill in the art will appreciate and understand the fields of an IPSEC protocol network packet. Accordingly, it is in the interest clarity and brevity that the fields are not further explained.

In at least one of the various embodiments, a portion of the SPI field, such as it upper bits may be arranged to contain the marker. In some embodiments, embedding the marker in the SPI field may be incompatible with computers/applications expecting standard/normal IPSEC. Accordingly, in some embodiments, gateway computers may be configured to recognize that the IPSEC SPI field may be being used for including the marker. Accordingly, in at least one of the various embodiments, the embedded marker may be provided to a TMD to apply one or more routing/traffic policies based on the value of the marker.

Generalized Operations

Figure 9:
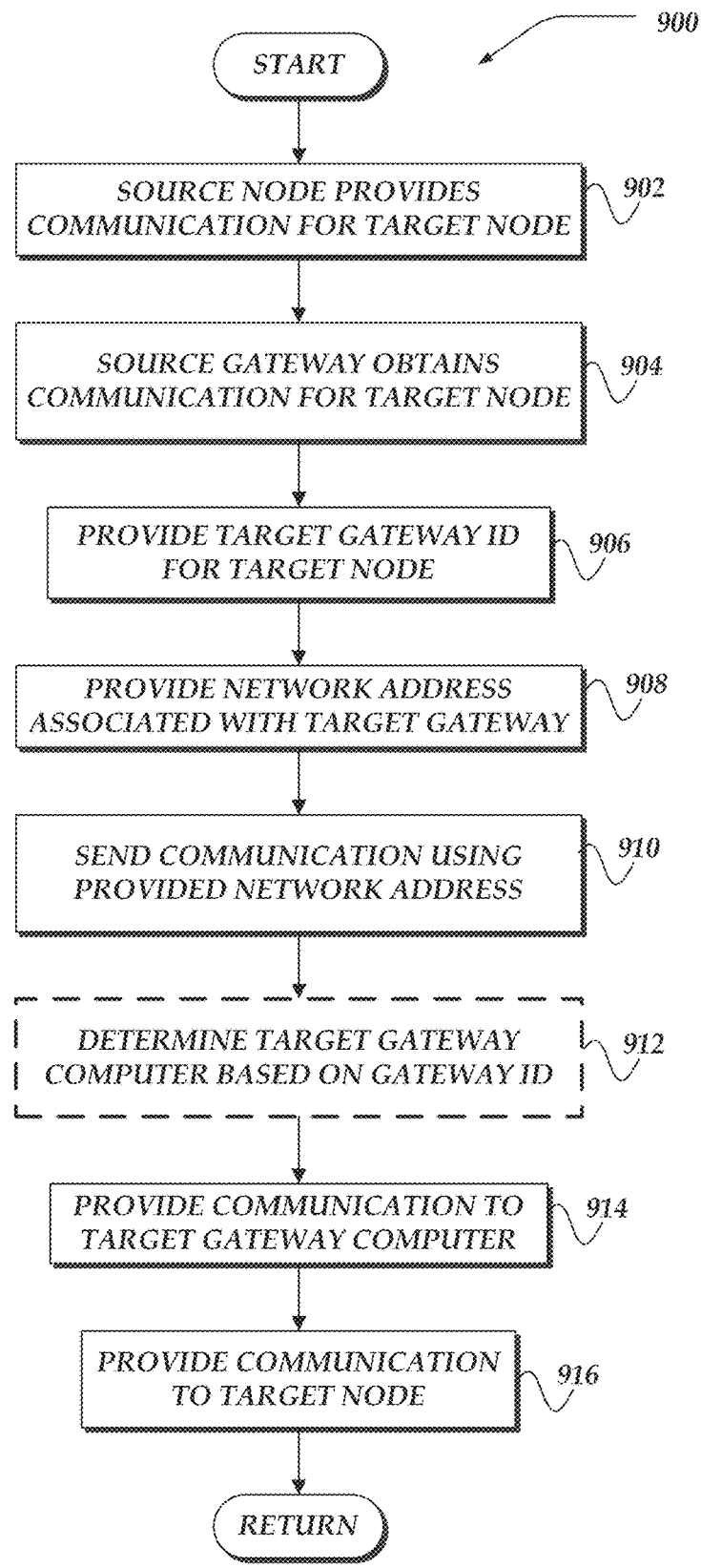
FIG. 9 illustrates an overview flowchart of a process for horizontal switch scalability via load balancing in accordance with at least one of the various embodiments.
Figure 10:
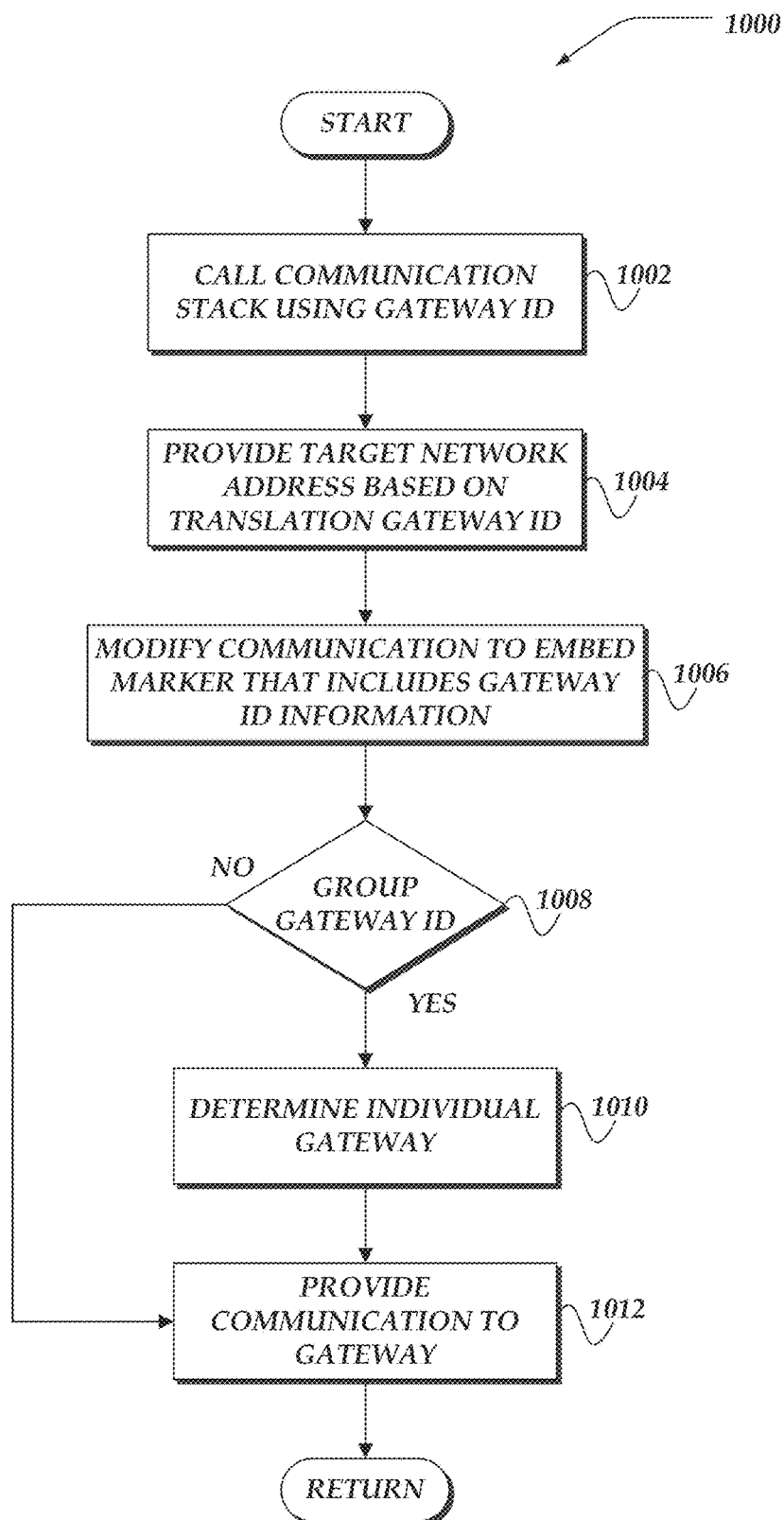
FIG. 10 illustrates an overview flowchart of a process for horizontal switch scalability via load balancing in accordance with at least one of the various embodiments.
Figure 11:
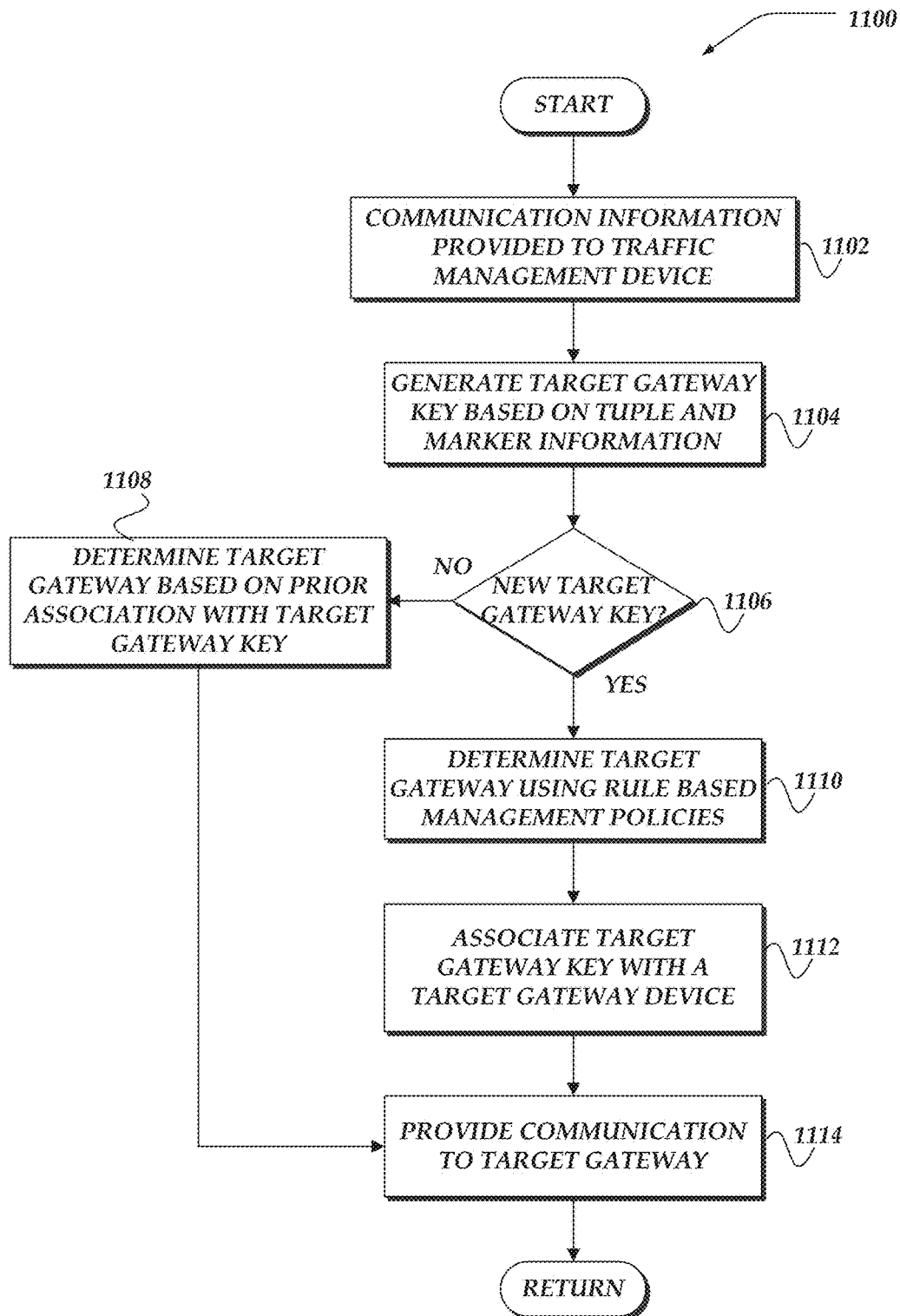
FIG. 11 illustrates an overview flowchart of a process for horizontal switch scalability via load balancing in accordance with at least one of the various embodiments.

FIGS. 9-11 represent the generalized operation of horizontal switch scalability via load balancing in accordance with at least one of the various embodiments. In at least one of the various embodiments, processes 900, 1000, and 1100 described in conjunction with FIGS. 9-11 may be implemented by and/or executed on one or more processors of a management platform computer, an industrial security computer, a network computer, or the like, such as, network computer 300 of FIG. 3. In other embodiments, these processes, or portions thereof, may be implemented by and/or executed on one or more processors of a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 9-11 may be used for horizontal switch scalability via load balancing in accordance with at least one of the various embodiments and/or architectures such as those described in conjunction with FIGS. 4-8. Further, in at least one of the various embodiments, some or all of the action performed by processes 900, 1000, and 1100 may be executed in part by overlay network application 322, management platform application 324, and network routing application 326, or the like, or combination thereof.

FIG. 9 illustrates an overview flowchart of process 900 for horizontal switch scalability via load balancing in accordance with at least one of the various embodiments. After a start block, at block 902, in at least one of the various embodiments, a source node may provide communication information that is directed to a target node. In at least one of the various embodiments, the target node may be an industrial device in the network. In other embodiments, target nodes may be a service that may be internal or external to a local network. Communication may be related to the operation of a particular application on the nodes. For example, a manufacturing robot may be arranged to upload status information to a manufacturing management service. Accordingly, in this example, the robot may be the source node and the manufacturing management service may be the target node. Also, for example, the source node may be a PC workstation that a factory floor operator is using to access files stored on a central file server.

In at least one of the various embodiments, communication information may be in the form of network packets that conform to one or more network protocols. Further, in at least one of the various embodiments, the establishment of a new communication session may include a connection/session handshake process that may be distinct from the normal operation of a session depending on the application and/or protocols being used. For example, TCP/IP, SSL, IPSEC, or the like, have defined handshake protocols that may signal the initialization and/or establishment of a communication session over a network.

At block 904, in at least one of the various embodiments, a source gateway computer may obtain the communication from the node computer. In at least one of the various embodiments, as described above, each node computer may be associated with at least one gateway computer. Since the gateway computer is disposed between the node computer and the industrial network, the source node computer is disabled from communicating directly with the target source node. Accordingly, the source node computer may be arranged to first provide the communication to its gateway computer.

At block 906, in at least one of the various embodiments, a gateway ID (GID) may be provided for the target gateway computer. In at least one of the various embodiments, each gateway computer in an industrial network may be arranged to have a map of each node computer and their associated gateway computer. Accordingly, the gateway computer that receives the communication from the source node may be arranged to lookup the GID for the 'target' gateway computer that may be associated with the target node computer. For example, in some embodiments, a gateway computer may have access to an index that maps nodes to their respective gateway computers. In some embodiments, the management platform server computer may provide the index information to one or more of the gateway computers.

At block 908, in at least one of the various embodiments, a network address that is associated with the target gateway may be provided. In at least one of the various embodiments, the gateway computer may be arranged to maintain a mapping of GIDs to network addresses. Accordingly, the source gateway computer may be arranged to derive the network address of the target gateway computer from the GID of the target gateway computer.

In at least one of the various embodiments, the information, including maps, indexes, lists, or the like, that may be used to provide the network address that is associated with the target gateway computer may be provided by the management platform server computer for the network.

At block 910, in at least one of the various embodiments, send the communication over network using the provided network address. In at least one of the various embodiments, the source gateway computer employ one or more network protocols to send the communication and direct it to the target gateway. In some embodiment, the network path of the communication may be indirect in the sense the one or more intermediary network devices and/or network computers may receive the communication data before it arrives at the target gateway computer.

In at least one of the various embodiments, since the GID of the target gateway computer has been mapped to a valid network address, one or more standard network routing protocols, rules, or the like, may be applied to direct the communication to its destination.

At block 912, in at least one of the various embodiments, optionally, a traffic management device may be arranged to determine a specific gateway computer from among a group of gateway computers. The target GID may be used to determine if the communication is associated with a group or pool of gateway computer or an individual gateway computer.

In at least one of the various embodiments, if the GID of the target gateway is actually associated with a group of gateway computers rather than a single gateway computer, the traffic management device may select a particular gateway computer in the group based on one or more rule-based policies. In some embodiments, the rules for selecting the gateway computer may be complex or simple depending on the capabilities of the traffic management device. For example, a simple policy may implement round-robin distribution of the communication among the gateway computers that comprise the group. Whereas, a more complex policy may contemplate one or more performance metrics associated with the group members, the network, application type, content, content type, users, user roles, or the like, or combination thereof.

In at least one of the various embodiments, this step may be considered optional because in some embodiments, the communication may be communicated directly to a specific target gateway computer rather than to an intermediary device, such as, a traffic management device.

In at least one of the various embodiments, the management platform server may be arranged to map the GID for the 'target' gateway computer, to either an actual gateway computer, or to an intermediary traffic management device. The sending node and/or gateway computer may be unaware of the distinction since the GID-to-network address mapping step (e.g., block 908) occurs based on information provided by the management platform server.

At block 914, in at least one of the various embodiments, the communication may be provided to the target gateway computer. In at least one of the various embodiments, through the operation of in-use network protocols the communication may be provided to the target gateway computer. In at least one of the various embodiments, if the GID used for the target gateway corresponds to a traffic management device, the traffic management device may forward the communication to an individual gateway computer that may be part of a group. Otherwise, the communication may be provided to the gateway computer that corresponds to the target GID included by the source gateway computer.

At block 916, in at least one of the various embodiments, the communications may be provided to the target node computer for further processing. In some embodiments, upon reaching the target gateway computer, the overlay network stack may be arranged to map the network address to the appropriate target node and communicate the information to the target node.

In at least one of the various embodiments, the target node may be a service and/or application that may be hosted on the target gateway computer. Accordingly, in these situations that communication between the target gateway computer and the target node computer may be one or more well-known inter-process communication methods, network communication between co-hosted virtual machines, or the like. Next, control may be returned to a calling process.

FIG. 10 illustrates an overview flowchart of process 1000 for horizontal switch scalability via load balancing in accordance with at least one of the various embodiments. After a start block, at block 1002, in at least one of the various embodiments, an application running on a gateway computer may execute a call to the communication facilities of the gateway computer. The call to the communication facilities may include a GID for a target gateway computer. In at least one of the various embodiments, an application, such as, overlay network application 322, network routing application 326, or the like, may perform various actions to initiate a communication from a source gateway computer to a target gateway computer.

In at least one of the various embodiments, the GID may be provided as a parameter value to a network communication API. As mentioned above, in some embodiments, the GID may be arranged to conform to the data structure/data type requirements of a regular network address. Accordingly, in some embodiments, the network API used by the applications may be the same network API's used to communicate using network addresses.

At block 1004, in at least one of the various embodiments, a target network address may be provided based on the target GID. In at least one of the various embodiments, the target GID may be translated/mapped to a particular network address that is associated with the GID. In at least one of the various embodiments, the format/specification of the network address may conform to the host networking environment. For example, the network address may be an IPv4 IP network address for IPv4 networking or an IPv6 network address for IPv6 networking.

At block 1006, in at least one of the various embodiments, the communication may be modified to include marker information that may be based on the target GID or other information associated with the communication, the network, or the like. In at least one of the various embodiments, as described above in FIG. 8, a marker may be generated to indicate that the communication may require special processing. For example, the marker information may be employed by a TMD to determine how one or more traffic management policies may be applied to the communication. In some embodiments, a marker may be deterministically generated based on portions of the communication such that it may be regenerated from network packets that are associated with the communication. For example, unencrypted fields in an IPSEC packet may be processed to generate a marker that identifies the communication. In some embodiments, the marker may be used to identify and/or disambiguate network flows from each other without having to decrypt secure content payloads. Accordingly, in some embodiments, the marker may be comprised of tuple information, or other available identifiers. In at least one of the various embodiments, a hashing function may be applied to the marker information to generate a marker.

In at least one of the various embodiments, the marker may be arranged to be seamlessly compatible with the communication protocol that is used for the communication. Accordingly, the communication may be modified to add the marker to the communication (e.g., embed the marker in its network packets) without disrupting or otherwise interfering with the network protocol of the communication. For example, as described in FIG. 8, a marker may be installed in the SPI field of an IPsec packet (e.g., FIG. 8, field 814).

In at least one of the various embodiments, gateway computers and/or TMD's may configured and arranged recognize and/or differentiate protocol fields that include markers from un-marked fields, such as, modified IPSEC SPI fields as described above. Likewise, in some embodiments, computers not-so configured may be unable to interpret or recognize the markers.

At decision block 1008, in at least one of the various embodiments, if the target GID corresponds to group of gateway computers, control may flow to block 1010; otherwise, control may flow to block 1012. In at least one of the various embodiments, GIDs may be associated with a single gateway computer of a group of gateway computers. In at least one of the various embodiments, GIDs associated with a group of gateway computers may be communicated to a traffic management device that provides a single network address for the group of gateway computers. In at least one of the various embodiments, GIDs associated with a single gateway computer may be handled by providing the communication directly to that gateway computer.

At block 1010, in at least one of the various embodiments, an individual gateway computer from among the grouped gateway computers may be determined. In at least one of the various embodiments, a traffic management device may be arranged to examine communications provided to a gateway group. In at least one of the various embodiments, one or more various functions of the traffic management device may be applied to determine a particular gateway computer of the group. As discussed above, one or more of the built-in-features of the traffic management device may be used to make the determination. Accordingly, features of the particular traffic management device may determine how or by what criteria the particular gateway computer may be selected. For example, a high-featured traffic management device may be monitoring various performance metrics of the network and/or the individual gateway computers in the group. A less-featured traffic management device may be limited to using a round-robin process to select the particular gateway computer.

At block 1012, in at least one of the various embodiments, the communication may be provided to the determined gateway computer. In at least one of the various embodiments, if the target gateway computer is selected, the communication may be provided over the network. In at least one of the various embodiments, one or more standard network and/or secure network protocols may be used to provide the communication to the ultimate target gateway computer. Next, control may be returned to a calling process.

FIG. 11 illustrates an overview flowchart of process 1100 for horizontal switch scalability via load balancing in accordance with at least one of the various embodiments. After a start block, at block 1102, in at least one of the various embodiments, communication information provided to a traffic management device. As described above, communication directed to target node may be first provided to a traffic management device that may be disposed between the source gateway computer and the target gateway computer. Also, in some embodiments, communications sent using GIDs that are associated with gateway groups may be provided to a traffic management device for selecting a particular gateway computer in the group. In at least one of the various embodiments, GIDs associated with a gateway group may be associated with a network address of the traffic management device that is associated with a gateway group represented by the GID.

At block 1104, in at least one of the various embodiments, a target gateway key may be generated based on information comprising the communication. In at least one of the various embodiments, the target gateway key may be generated from tuple information included in the communication and/or the marker information which may also be included in the communication.

In at least one of the various embodiments, the target gateway key may be generated using various hashing functions, or the like, that may be arranged to generate a key that may be used as an index to select a particular target gateway computer. For example, in some embodiments, the target gateway key value may be treated as an integer so modulo arithmetic may be employed to provide an index to a particular target gateway computer. (E.g., Gateway Computer Index=hash(key-data) modulo number-of-target-gateway-computers-in-cluster.) One of ordinary skill in the art will appreciate that other well-known, and/or custom, distribution algorithms may be employed to provide an index to a target gateway computer based on information that may be available in the communication.

In at least one of the various embodiments, the particular functions used to create a target gateway key may depend on the functionality of the particular traffic management device. In some embodiments, the communication may be directed to another specialized device that may be arranged to provide a target gateway key from the tuple information and the marker information included in the communication.

At decision block 1106, in at least one of the various embodiments, if the target gateway key is a new key, control may flow to block 1110; otherwise, control may flow to block 1108. In at least one of the various embodiments, the traffic management device may be arranged to compare the generated target gateway key to a list and/or database of other target gateway keys. If the key provided by block 1104 is absent from the list and/or database, the target gateway key may be considered a new key.

In at least one of the various embodiments, if the provided target gateway key is matched and/or found in the list and/or database of known keys, the traffic management device may consider the provided target gateway key a known key.

At block 1108, in at least one of the various embodiments, a target gateway device may be determined based on a previous association with a target gateway key. In at least one of the various embodiments, the target gateway network address/identity may be obtained from a list, table, database, or the like, that associates the target gateway key with information regarding the network address/identity of the target gateway computer. In at least one of the various embodiments, the network address/identity information may include values that a traffic management device may be arranged to employ the network address/identity information to identify one or more target gateway computers.

At block 1110, in at least one of the various embodiments, a target gateway computer may be determined by employing one or more rule-based management policies. In at least one of the various embodiments, since the target gateway key was not located, it may correspond to a new session and/or connection. Thus, in at least one of the various embodiments, the particular endpoint (target gateway computer) may not have been determined yet. Accordingly, the traffic management device may be arranged to apply one or more traffic management policy rules to determine a particular target gateway computer from among the group of target gateway computers. The particular policy and/or how it executes may depend on the capabilities of the traffic management device and/or how the traffic management device may be configured. For example, if the traffic management device is configured to implement a round-robin policy, the next available target gateway computer (in the round-robin list) may be selected.

At block 1112, in at least one of the various embodiments, the target gateway key may be associated with the target gateway computer. In at least one of the various embodiments, the target gateway key and information, such as, network address, identity, or the like, sufficient to identify the target gateway computer within the group may be stored in a list, index, table, database, or the like, and associated with the target gateway key. Accordingly, information sufficient for identifying the target gateway computer may be retrieved from the list, index, table, or database using the target gateway key.

At block 1114, in at least one of the various embodiments, the communication may be provided to the determined target gateway computer. In at least one of the various embodiments, the traffic management device may use the network address and/or identity of the target gateway computer to provide the communication to the target gateway computer. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system or multi-core computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by one or more hardware microcontrollers instead of a CPU. In at least one embodiment, the one or more microcontrollers may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing secure communication over a network, wherein one or more processors included in a network computer perform actions, comprising:
   in response to a source node sending a communication to a target node over the network, employing a source gateway to receive the communication and perform actions to forward the communication over the network to the target node, including:
   providing a gateway identifier (GID) that is associated with one or more target gateways on the network that are associated with the target node, wherein marker information is embedded in the communication that includes a portion of the GID; and
   in response to receiving the communication from the source gateway over the network one or more traffic management devices perform actions, including:
   selecting a target gateway from the one or more target gateways based on a traffic management policy or the marker information that includes the portion of the GID;
   associating a gateway key with the selected target gateway; wherein the gateway key is based on at least a portion of the communication and the marker information; and
   providing the communication to the selected target gateway, wherein the selected target gateway provides the communication to the target node, and wherein the network includes an overlay network and a plurality of gateways connected to the overlay network, wherein each gateway is arranged to physically isolate each node from a physical network that interconnects the overlay network, and wherein the overlay network is employed to enforce virtual or emulated interconnection paths between endpoints on the network.

2. The method of claim 1, wherein the network includes another overlay network and a plurality of gateways connected to the other overlay network, wherein the other overlay network enables each node to identify one or more other nodes on the other overlay network even though each node is isolated behind the plurality of gateways on the overlay network.

3. The method of claim 1, further comprising a management platform server computer that provides one or more of rules or policies that restrict how one or more gateways communicate with one or more of each other or one or more nodes over another overlay network for the network.

4. The method of claim 1, wherein the one or more traffic management devices select the target gateway from a group of two or more gateways that are associated with the target node to share a load in providing a plurality of communications to the target node.

5. The method of claim 1, further comprising a table that includes the gateway key's association with the selected target gateway, wherein the one or more traffic management devices employs the table to forward one or more subsequent communications for the target node to the same selected target gateway.

6. The method of claim 1, wherein the traffic management device performs further actions comprising: providing the gateway key that corresponds to a network flow that is associated with the communication, wherein the gateway key is based on at least a portion of the communication's marker information.

7. A system for managing secure communication over a network, comprising:
  a source node, comprising:
    a memory that stores instructions; and
    one or more processors that execute the instructions to perform actions, including:
      sending a communication to a target node over the network; and
  a source gateway, comprising:
    a memory that stores instructions; and
    one or more processors that execute the instructions to perform actions, including:
      in response to receiving the communication to the target node over the network, performing actions to forward the communication over the network to the target node, including:
      providing a gateway identifier (GID) that is associated with one or more target gateways on the network that are associated with the target node, wherein marker information is embedded in the communication that includes a portion of the GID; and
      providing a gateway identifier (GID) that is associated with one or more target gateways on the network that are associated with the target node, wherein marker information is embedded in the communication that includes the GID; and
  a traffic management device; comprising:
    a memory that stores instructions; and one or more processors that execute the instructions to perform actions, including:
      in response to receiving the communication from the source gateway over the network one or more traffic management devices perform actions, including:
      selecting a target gateway from the one or more target gateways based on a traffic management policy or the marker information that includes the portion of the GID;
      associating a gateway key with the selected target gateway; wherein the gateway key is based on at least a portion of the communication and the marker information; and
      providing the communication to the selected target gateway, wherein the selected target gateway provides the communication to the target node, and wherein the network includes an overlay network and a plurality of gateways connected to the overlay network, wherein each gateway is arranged to physically isolate each node from a physical network that interconnects the overlay network, and wherein the over network is employed to enforce virtual or emulated interconnection paths between endpoints on the network.

8. The system of claim 7, wherein the network includes another overlay network and a plurality of gateways connected to the other overlay network, wherein the other overlay network enables each node to identify one or more other nodes on the other overlay network even though each node is isolated behind the plurality of gateways on the overlay network.

9. The system of claim 7, further comprising a management platform server computer that provides one or more of rules or policies that restrict how one or more gateways communicate with one or more of each other or one or more nodes over another overlay network for the network.

10. The system of claim 7, wherein the one or more traffic management devices select the target gateway from a group of two or more gateways that are associated with the target node to share a load in providing a plurality of communications to the target node.

11. The system of claim 7, further comprising a table that includes the gateway key's association with the selected target gateway, wherein the one or more traffic management devices employs the table to forward one or more subsequent communications for the target node to the same selected target gateway.

12. The system of claim 7, wherein the traffic management device performs further actions comprising: providing the gateway key that corresponds to a network flow that is associated with the communication, wherein the gateway key is based on at least a portion of the communication's marker information.

13. A network management platform for managing secure communication over a network, wherein one or more processors included in the platform execute instructions that perform actions, comprising:
  in response to a source node sending a communication to a target node over the network, enabling a source gateway to receive the communication and perform actions to forward the communication over the network to the target node, including:
  providing a gateway identifier (GID) that is associated with one or more target gateways on the network that are associated with the target node, wherein marker information is embedded in the communication that includes a portion of the GID; and
  in response to receiving the communication from the source gateway over the network one or more traffic management devices perform actions, including:
    selecting a target gateway from the one or more target gateways based on a traffic management policy or the marker information that includes the portion of the GID;
    associating a gateway key with the selected target gateway; wherein the gateway key is based on at least a portion of the communication and the marker information; and
    providing the communication to the selected target gateway, wherein the selected target gateway provides the communication to the target node, and wherein the network includes an overlay network and a plurality of gateways connected to the overlay network, wherein each gateway is arranged to physically isolate each node from a physical network that interconnects the overlay network, and wherein the over network is employed to enforce virtual or emulated interconnection paths between endpoints on the network.

14. The platform of claim 13, wherein the network includes another overlay network and a plurality of gateways connected to the other overlay network, wherein the other overlay network enables each node to identify one or more other nodes on the other overlay network even though each node is isolated behind the plurality of gateways on the overlay network.

15. The platform of claim 13, performs further actions including providing one or more of rules or policies that restrict how one or more gateways communicate with one or more of each other or one or more nodes over another overlay network for the network.

16. The platform of claim 13, wherein the one or more traffic management devices perform further actions including select the target gateway from a group of two or more gateways that are associated with the target node to share a load in providing a plurality of communications to the target node.

17. The platform of claim 13, further comprising a table that includes the gateway key's association with the selected target gateway, wherein the one or more traffic management devices employ the table to forward one or more subsequent communications for the target node to the same selected target gateway.

18. The platform of claim 13, wherein the traffic management device performs further actions comprising: providing the gateway key that corresponds to a network flow that is associated with the communication, wherein the gateway key is based on at least a portion of the communication's marker information.

\* \* \* \* \*